July 25, 1933.   G. E. JANSSON   1,919,466

ELECTRIC DISTRIBUTION SYSTEM

Filed Nov. 3, 1930

Inventor.
Gustav E. Jansson

Patented July 25, 1933

1,919,466

UNITED STATES PATENT OFFICE

GUSTAV E. JANSSON, OF ATLANTIC, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

ELECTRIC DISTRIBUTION SYSTEM

Application filed November 3, 1930. Serial No. 493,014.

This invention relates to electrical distribution systems in which a plurality of feeder circuits are supplied with power from a main distribution circuit or, in some cases, from a station bus; and is particularly adapted to distribution systems in which the main distribution circuit is provided with a heavy duty overload-responsive circuit interrupter, and the branch feeder circuits are provided each with a feeder disconnecting switch which is arranged to open automatically when voltage fails due to the operation of the main circuit interrupter. In a system of this type the feeder disconnecting switches are never called upon to interrupt current and consequently can be of very small current-interrupting capacity, thus effecting a considerable economy.

When a short-circuit, or a permanent heavy current fault, occurs in a branch feeder it is desired to isolate that particular feeder from the system and permit service on the unaffected feeders to be continued; and it is an object of this invention to provide automatic means operative upon occurrence of an overload condition, as a short circuit, in any feeder to disconnect the faulty feeder from the system.

A further object of the invention is to accomplish the above result without necessitating the opening of the disconnecting switches associated with those feeders which are unaffected by the overload.

In carrying out the invention means are associated with the undervoltage devices of the several disconnecting switches whereby they are restrained from operation upon failure of voltage in the system unless the failure of voltage is the result of an overload condition in the feeder circuit which they control. It is therefore a further object of the invention to provide a feeder disconnecting switch having undervoltage tripping means therefor which is normally held against tripping movement, and overload responsive means associated therewith for releasing it whereby to permit the disconnecting switch associated with a faulty feeder to open and disconnect the feeder from the system while maintaining the unaffected feeders connected with the system.

A further object is generally to improve distribution and protective systems.

Figure 1:
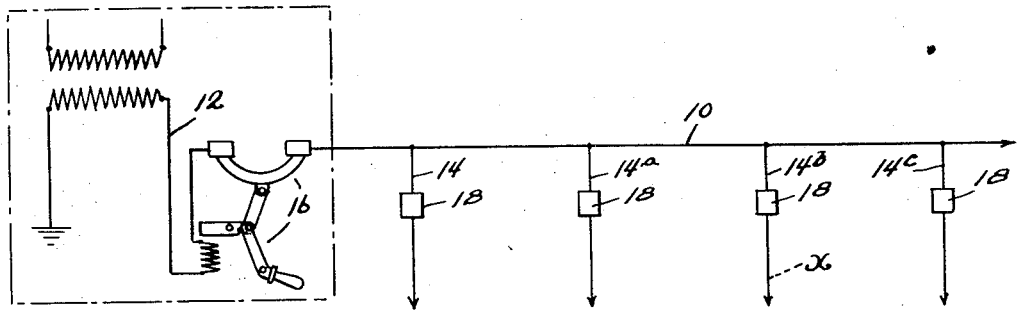
Fig. 1 is a diagrammatic single-wire illustration of a distribution system embodying the invention.

Fig. 1 illustrates one phase of a distribution system wherein the conductor 10 of the main distribution circuit is extended as a radial feeder from the station bus bar 12 and supplies power to a plurality of branch feeder circuits 14, 14a, 14b and 14c. An overload responsive circuit interrupter 16 is provided at the station end of said distribution circuit and is adapted to open the conductor 10 of said circuit upon occurrence of an overload condition therein or in any of the branch feeder circuits 14 connected therewith. Each of said branch feeder circuits is connected to the conductor 10 through a feeder disconnecting switch 18 by means of which any feeder may be disconnected from the supply conductor 10 upon the occurrence of a faulty condition therein thus to isolate the fault from the system and permit service to be continued on the remainder of the system. Preferably the feeder disconnecting switches 18 are never called upon to interrupt current, but are designed to open upon failure of voltage, as upon operation of the interrupter 16, although if desired, the switches can be arranged to interrupt the feeder circuits under normal current conditions at the will of an operative.

Figure 2:
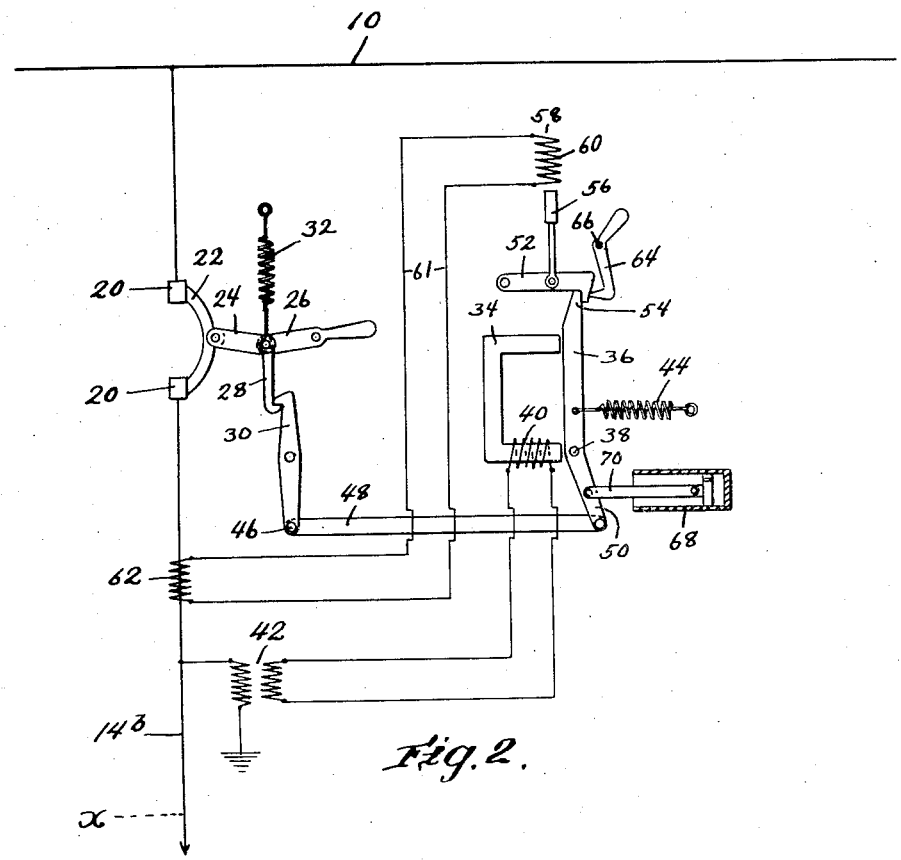
Fig. 2 is a diagrammatic representation of a feeder disconnecting switch showing the circuit connections thereof which embody the present invention.

As shown in Fig. 2, each feeder disconnecting switch includes a pair of stationary contact members 20, a movable contact bridging member 22, and operating mechanism including the toggle links 24 and 26 which are adapted normally in the closed position of the switch to occupy a slightly over-shot position. One of said toggle links as the link 24 is provided with an angularly related latch arm 28 which is engaged by the latch 30 in the straightened position of said toggle whereby to hold the switch closed against the action of a tensile spring 32 which normally biases said operating mechanism for switch opening movement.

Undervoltage means are associated with each feeder disconnecting switch to trip the switch open when the circuit interrupter 16 has operated and has de-energized the system. Said means includes a U-shaped magnetic core member 34 having an armature 36 which is pivoted at 38 to one leg of said core, and an energizing winding 40 which is normally energized at the potential of the feeder 14 by means of a potential transformer 42, whereby to attract the armature 36 and maintain it in attracted position at the time normal potential prevails in the feeder. A tensile spring 44 constantly biases the armature 36 into an unattracted position in which the latch member 30 of the disconnecting switch is adapted to be tripped. To this end said latch 30 has pivoted thereto at 46 a connecting rod 48 which is pivoted to an integral depending projection 50 of the armature 36 at its other end, thus to connect said latch 30 and the armature 36 for conjoint movement.

In accordance with this invention, however, overload-responsive means are provided normally to prevent the aforesaid tripping action upon occurrence of an undervoltage condition in the feeder. Said means includes a latch member 52 which is arranged to engage a projecting end portion 54 of the armature 36 of said under voltage device whereby normally to prevent the switch tripping action thereof. Said latch 52 is operatively connected with the plunger 56 of an overload responsive solenoid 58, the winding 60 of which is connected through conductors 61 with the secondary 62 of a series transformer, the primary of which is energized by current flowing in the feeder 14. The current setting of the solenoid 58 is adapted to be such that the solenoid 56 thereof and consequently the latch 52 will be raised only when an overload current flows in the feeder 14 which is of sufficient magnitude to effect the overload opening of the main circuit interrupter 16. A latch 64 having a fixed pivot at 66 is constantly biased, as by gravity, into a position beneath the latch 52 whereby said latch 52 and the solenoid 56 associated therewith, when once operated, are held in elevated position, in which position the armature 36 of the undervoltage device is free to move under the influence of the spring 44 into its unattracted switch tripping position upon de-energization of winding 40. It will thus be evident that the presence of an undervoltage condition alone in a feeder circuit will not result in the tripping of the disconnecting switch 18; but that combined undervoltage and overload conditions in a feeder circuit will effect the tripping thereof. Since the disconnecting switches are of relatively small interrupting capacity and are not capable of interrupting heavy currents it is desirable to delay the opening thereof for a sufficient time to permit the main circuit interrupter 16 to open the line current. To this end suitable time delay means as the dash pot 68 are associated with the undervoltage device. As here shown the plunger rod 70 of the dash pot is pivotally connected with the depending projection 50 of armature 36. The time lag imposed on the disconnecting switch need be very slight if the main breaker 16 is instantly responsive to an overload in the feeders.

Assuming the main circuit interrupter 16 to be closed and normal conditions to prevail throughout the system, the operation of the system to disconnect a faulty feeder circuit is as follows:

If a fault occurs on any feeder, as at $x$ in feeder 14b, an overload current will flow in the conductor 10 of the main distribution circuit between the faulty feeder and the station bus 12 and the main circuit interrupter 16 will operate instantly to de-energize the system. At the same time the overload current flowing in feeder circuit 14b will cause the solenoid 58 to raise the latch 52, which will thereupon be latched in its elevated position, in which position the armature 36 of the undervoltage device controls the tripping of the disconnecting switch 18 and may be said to be conditioned for operation. Upon de-energization of the system by opening interrupter 16 the armature 36 controlling the disconnecting switch 18 of the faulty feeder will move to unattracted position and effect the tripping of the switch subject to a slight delay imposed by the dash pot 68. The feeder disconnecting switches of the other and unaffected feeders, however, will remain closed since the solenoids 58 thereof have not been subjected to an overload current and the undervoltage devices associated therewith are consequently latched against tripping movement. Upon reclosing of the interrupter 16, which may be accomplished manually or by any suitable automatic reclosing device, the conductor 10 and the feeder circuits connected therewith will be again energized with the exception of the faulty feeder 14b which is isolated from the system. A feeder which has been tripped out in this manner is adapted to remain disconnected until the fault has been removed whereupon the switch can again be closed by an operative and the feeder reconnected with the system.

Various changes may be made in the connection and arrangement of the apparatus without departing from the scope of the invention.

I claim:

1. An electric distribution system having a main distribution circuit and a plurality of branch feeder circuits, feeder disconnecting switches connecting said main and feeder circuits, means to deenergize the system including an overload responsive circuit interrupter in said main circuit, and means including an undervoltage relay associated with each feeder disconnecting switch and operative upon opening of said main switch to open the feeder disconnecting switch of an overloaded feeder while maintaining the disconnecting switches of unaffected feeder circuits closed.

2. An electric distribution system having a main distribution circuit and a branch feeder, a disconnecting switch connecting said circuit and feeder, undervoltage means operative to open said switch automatically upon failure of voltage in the system, means normally restraining said undervoltage means from operation whereby normally to prevent undervoltage opening of the switch, and means associated with said restraining means which is responsive to an overload condition in the feeder for releasing said restraining means of said undervoltage means.

3. An electric distribution system having a main distribution circuit and a branch feeder, a disconnecting switch connecting said circuit and feeder, means responsive to an undervoltage condition in the feeder arranged automatically to open said switch, means normally restraining said undervoltage means from operation, and means responsive to an overload condition in the feeder for releasing said restraining means, whereby to permit the undervoltage tripping operation of said switch.

4. An electric distribution system having a main distribution circuit and a branch feeder, a disconnecting switch connecting said circuit and feeder, means responsive to a failure of voltage in the feeder to trip the switch including an armature which is held in attracted position when normal voltage obtains in the feeder, a latch normally holding said armature in its attracted position regardless of potential conditions in said feeder, means asociated with said latch and responsive to an overload condition in said feeder to move said latch out of engagement with said armature, and a second latch arranged to hold said first latch from re-engaging said armature when once it has been operated.

5. An electric distribution system having a main distribution circuit and a branch feeder, a disconnecting switch connecting said circuit and feeder, means to open said circuit automatically upon failure of voltage in the feeder including an electro-magnet energized from the potential of said feeder and having an armature which is held in attracted position when normal potential prevails in the feeder, means to bias said armature to unattracted position, a latch arranged to hold said armature releasably in attracted position irrespective of voltage conditions in the feeder, means which is responsive to overload current in said feeder for moving said latch out of holding relation with said armature, and means to hold said latch in armature releasing position when once it has been operated.

6. An electric distribution system having a main distribution circuit and a branch feeder, an overload opening circuit interrupter in said main circuit, a disconnecting switch connecting said circuit and feeder which is normally held closed, and means responsive to the combination of a feeder overload that opens said interrupter and the reduction of feeder potential caused thereby to effect the opening of the feeder switch.

7. An electric distribution system having a main distribution circuit and a branch feeder, a main circuit interrupter in said main circuit, a disconnecting switch in said feeder undervoltage tripping means constantly biased into a position for effecting the tripping of said disconnecting switch when said main switch is opened, means normally restraining said tripping means from operation whereby to hold said switch closed upon de-energization of said main switch, and overload responsive means associated with and arranged to release said restraining means and permit the undervoltage tripping of said switch upon overload operation of said main switch due to overload current in said feeder.

8. An electric distribution system having a main distribution circuit and a branch feeder, an overload responsive circuit interrupter controlling the energization and de-energization of said main circuit and said feeder, a disconnecting switch in said feeder, undervoltage tripping means for said disconnecting switch which is responsive to a failure of voltage in said feeder, means normally holding said tripping means against switch tripping movement, and means responsive to an overload condition in the feeder circuit arranged to release said holding means and means responsive to said overload to reduce the potential of said circuit and thereby effect the operation of said undervoltage tripping means to trip said switch.

9. An electric distribution system having a main distribution circuit and a plurality of branch feeder circuits adapted to receive energy from said main circuit, an overload responsive circuit interrupter in said main circuit controlling the energization and de-energization of the system, disconnecting switches connecting said feeders with said main circuit, said switches including tripping means responsive to an undervoltage condition in the system, means normally to prevent the undervoltage tripping of the switches whereby to maintain the feeders connected to the system during opening and closing movements of the main circuit interruptor, and means responsive to an overload condition in a feeder to condition the undervoltage tripping means thereof for switch tripping movement, whereby to trip the disconnecting switch of an overloaded feeder upon overload opening of said circuit interruptor and the consequent de-energization of said undervoltage tripping means.

10. An electric distribution system comprising a power source, a distribution circuit having several feeders, undervoltage tripping means operative automatically to open said switches upon opening of said breaker, means normally holding said tripping means from operation, an overload-responsive breaker connecting said power source and said distribution circuit, switches connecting said circuit and feeders, and means associated with the feeder switches responsive to the current of the respective feeders for releasing the holding means and opening the switch of a faulty feeder and for precluding the opening of the switches of the other feeders when said breaker opens in response to the overload current in the faulty feeder.

11. An electric distribution system comprising a power source, a distribution circuit having several feeders, an overload-responsive breaker connecting said power source and said distribution circuit, switches connecting said circuit and feeders, and means associated with the feeder switches responsive to a combined over-current and undervoltage condition on the respective feeders for opening the switch of a faulty feeder and for precluding the opening of the switches of the other feeders when said breaker opens in response to the overload current in the faulty feeder.

12. An electric distribution system having a main distribution circuit, a circuit interrupter in said main circuit adapted to open upon overload in the system, a feeder, a feeder disconnecting switch connecting said feeder to said distribution circuit, means responsive to a reduced-voltage on the feeder caused by the opening of said interrupter for opening the switch, means normally restraining said reduced voltage means from operation, and means responsive to an abnormal current in the feeder that effects the opening of said interrupter to release the restraint of said restraining means, whereby to condition said reduced-voltage means for operation upon opening of said interrupter to de-energize the system.

13. An electric distribution system having a main distribution circuit, a circuit interrupter in said circuit adapted to open upon occurrence of overload in the system, a feeder, a feeder disconnecting switch connecting said feeder to said distribution circuit, means responsive to a reduced voltage on the feeder caused by the opening of said interrupter for opening the switch, means normally restraining said reduced-voltage means from operation, means responsive only to an abnormal current in the feeder that effects the opening of said interrupter to release the restraint of said restraining means, whereby to condition said reduced-voltage means for operation following the opening of said interrupter to de-energize the system, and means operative following the operation of said current responsive means which holds said restraining means in an ineffective condition.

14. An electric distribution system comprising a feeder, a switch in the feeder, means responsive to a reduced voltage on the feeder for opening said switch, means which normally prevents the opening of the switch by said reduced voltage means but which has means responsive to an abnormal current condition of the feeder to condition the switch for opening by said reduced voltage means, and means responsive to said abnormal current condition for reducing the voltage on the feeder to effect the operation of said reduced voltage means to open the switch.

15. An electric distribution system comprising a main distribution circuit, a plurality of branch feeder circuits, a switch in each feeder circuit, means in each feeder circuit responsive to an overload therein for conditioning its associated switch for opening, an overload opening circuit interrupter in the main distribution circuit, and means in each feeder circuit and responsive to the opening of said interrupter for effecting the opening of only such switches as have been conditioned for opening by an overload in their respective feeders.

GUSTAV E. JANSSON.